United States Patent
Katano

(10) Patent No.: US 9,676,352 B2
(45) Date of Patent: Jun. 13, 2017

(54) POWER DISTRIBUTION DEVICE HAVING PROJECTED PORTION

(71) Applicant: TOYOTA JIDOSHA KABUSHIKI KAISHA, Toyota-shi, Aichi-ken (JP)

(72) Inventor: Koji Katano, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 309 days.

(21) Appl. No.: 14/503,826

(22) Filed: Oct. 1, 2014

(65) Prior Publication Data
US 2015/0097424 A1  Apr. 9, 2015

(30) Foreign Application Priority Data

Oct. 4, 2013  (JP) .................................. 2013-209269

(51) Int. Cl.
*B60R 16/033* (2006.01)
(52) U.S. Cl.
CPC .................................. *B60R 16/033* (2013.01)
(58) Field of Classification Search
CPC .................................................... B60R 16/033
USPC .......................................................... 307/9.1
See application file for complete search history.

(56) References Cited

U.S. PATENT DOCUMENTS

| 7,561,445 B2* | 7/2009 | Yajima | B60K 6/445 174/72 A |
| 7,641,499 B1* | 1/2010 | George | B60L 3/0069 439/352 |
| 8,167,262 B2* | 5/2012 | DeDona | B60R 11/00 248/674 |
| 9,199,537 B2* | 12/2015 | Hotta | B60K 1/00 |
| 9,254,871 B2* | 2/2016 | Hotta | B62D 21/155 |
| 2014/0062180 A1* | 3/2014 | Demmerle | H01H 51/28 307/9.1 |
| 2014/0062493 A1* | 3/2014 | Farrell | B60R 16/033 324/426 |
| 2014/0113161 A1* | 4/2014 | Katano | B60L 1/003 429/9 |

FOREIGN PATENT DOCUMENTS

| JP | 2013-17245 | 1/2013 |
| JP | 2013-066327 | 4/2013 |
| JP | 2013-103587 | 5/2013 |

* cited by examiner

*Primary Examiner* — Jared Fureman
*Assistant Examiner* — Michael Warmflash
(74) *Attorney, Agent, or Firm* — Finnegan, Henderson, Farabow, Garrett & Dunner, LLP

(57) ABSTRACT

A power distribution device is electrically connected to a battery, a power control unit that controls electric power in a vehicle, and high-voltage driven devices driven at a specified voltage or higher. The power distribution device distributes electric power supplied from the battery to the high-voltage driven devices, the power distribution device is installed in a front portion of the vehicle, and a high-voltage power line is disposed behind a position at which the power distribution device is installed. The power distribution device includes a projected portion provided on a surface of a case of the power distribution device, the projected portion having a height corresponding to a vehicle component disposed behind the power distribution device in the vehicle.

6 Claims, 7 Drawing Sheets

POWER DISTRIBUTION DEVICE HAVING PROJECTED PORTION

INCORPORATION BY REFERENCE

The disclosure of Japanese Patent Application No. 2013-209269 filed on Oct. 4, 2013 including the specification, drawings and abstract is incorporated herein by reference in its entirety.

BACKGROUND OF THE INVENTION

1. Field of the Invention

The present invention relates to a power distribution device that is connected to a battery, a power control unit that controls electric power in a vehicle, and high-voltage driven devices.

2. Description of Related Art

In recent years, development of a fuel cell that generates electric power using supplied hydrogen (fuel gas) and supplied air that contains oxygen (oxidant gas) has been advanced. Expectation has been placed on this fuel cell as a power source of a fuel cell vehicle, for example.

In addition to the fuel cell, various auxiliary machines that are operated during power generation performed by the fuel cell need to be installed in this fuel cell vehicle. In addition, these auxiliary machines need to be electrically connected to a power control unit that controls electric power from a battery or the like that serves as a power source of the vehicle.

In such a case, if various auxiliary machines are connected to the power control unit by harnesses, a large number of high-voltage harnesses are needed. For example, in order to secure safety at the time of a vehicle collision, a protector needs to be provided on each harness, or a space for each harness needs to be provided in the vehicle. However, this results in an increase in a vehicle weight and an increase in cost.

Meanwhile, a fuel cell vehicle has been known, in which a power distribution device (a distribution unit) is provided in an electricity flow path between a battery and a power control unit and the power distribution device distributes electric power to various auxiliary machines and the like, in order to solve the problems of the increase in the vehicle weight and the increase in cost (for example, Japanese Patent Application Publication No. 2013-17245 (JP 2013-17245 A)).

There is a case where the power distribution device installed in a vehicle moves from an initial suitable position toward the vehicle rear side when an external force is applied from ahead of the vehicle during a vehicle collision. In such a case, a high-voltage power line (for example, a high-voltage power line that electrically connects various auxiliary machines and the power distribution device) that is disposed behind the power distribution device in the vehicle may be damaged. Thus, when the power distribution device is disposed in a front side of the vehicle and the high-voltage power line is disposed behind the power distribution device in the vehicle, it is necessary to prevent interference of the power distribution device with the high-voltage power line that is disposed in the rear side in the vehicle, due to an impact from the vehicle front side. However, conventionally, a specific study has not been conducted on suppression of movement of the power distribution device from the initial suitable position toward the vehicle rear side.

SUMMARY OF THE INVENTION

The present invention provides a power distribution device whose movement toward a vehicle rear side is suppressed at the time of a vehicle collision.

An aspect of the present invention relates to a power distribution device that is electrically connected to a battery, a power control unit that controls electric power in a vehicle, and high-voltage driven devices driven at a specified voltage or higher, wherein the power distribution device distributes electric power supplied from the battery to the high-voltage driven devices, the power distribution device is installed in a front portion of the vehicle, and a high-voltage power line is disposed behind a position at which the power distribution device is installed. The power distribution device includes a projected portion provided on a surface of a case of the power distribution device, the projected portion having a height corresponding to a vehicle component disposed behind the power distribution device in the vehicle. In the present invention, "the high-voltage driven devices that are driven at the specified voltage or higher" signify high-voltage driven devices that are driven at DC 60 V or higher, for example.

According to the above aspect of the present invention, when the power distribution device moves toward the vehicle rear side, the projected portion interferes with the vehicle component that is disposed behind the power distribution device in the vehicle. Thus, it is possible to suppress further movement of the power distribution device toward the vehicle rear side. As a result, the high-voltage power line provided behind the power distribution device in the vehicle can be prevented from being damaged.

In the above aspect of the present invention, a rib may be provided on the projected portion, and the rib may be tilted forward as the rib extends outward in a right-left direction of the vehicle.

In the above aspect, since the rib that is tilted toward the vehicle front side is provided on the projected portion, the rib can receive an impact applied to the projected portion from the vehicle front side while being compressed.

In the above aspect of the present invention, a plurality of the projected portions may be provided, the power distribution device may further include a plurality of fixed portions that fix the power control unit and the case to each other, and at least one of the projected portions may be provided in a region between an extension line that extends in a vehicle longitudinal direction through one of the fixed portions and an extension line that extends in the vehicle longitudinal direction through another of the fixed portions.

In the above aspect, since an impact force applied to the projected portion can be directly transmitted to the fixed portions, it is possible to suppress occurrence of a situation in which an adjacent member is damaged as a result of the force being applied to the adjacent member. As a result, since strength of the adjacent member needs not be increased, it is not necessary to additionally provide reinforcement against a collision. Therefore, it is possible to suppress an increase in a vehicle weight and an increase in cost.

In the above aspect of the present invention, a plurality of the projected portions may be provided, and at least one of the projected portions may be provided on an extension line that extends in a vehicle longitudinal direction through a side wall portion in a front side of the case in the vehicle.

In the above aspect, the projected portion is provided on the extension line that extends in the vehicle longitudinal direction through the side wall portion in the front side of the power distribution device. Thus, a force applied from the front side of the power distribution device due to an impact from the vehicle front side can be easily transmitted to the projected portion.

According to the above aspect of the present invention, it is possible to suppress movement of the power distribution device toward the vehicle rear side at the time of the vehicle collision. Therefore, the high-voltage power line provided behind the power distribution device in the vehicle can be prevented from being damaged.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
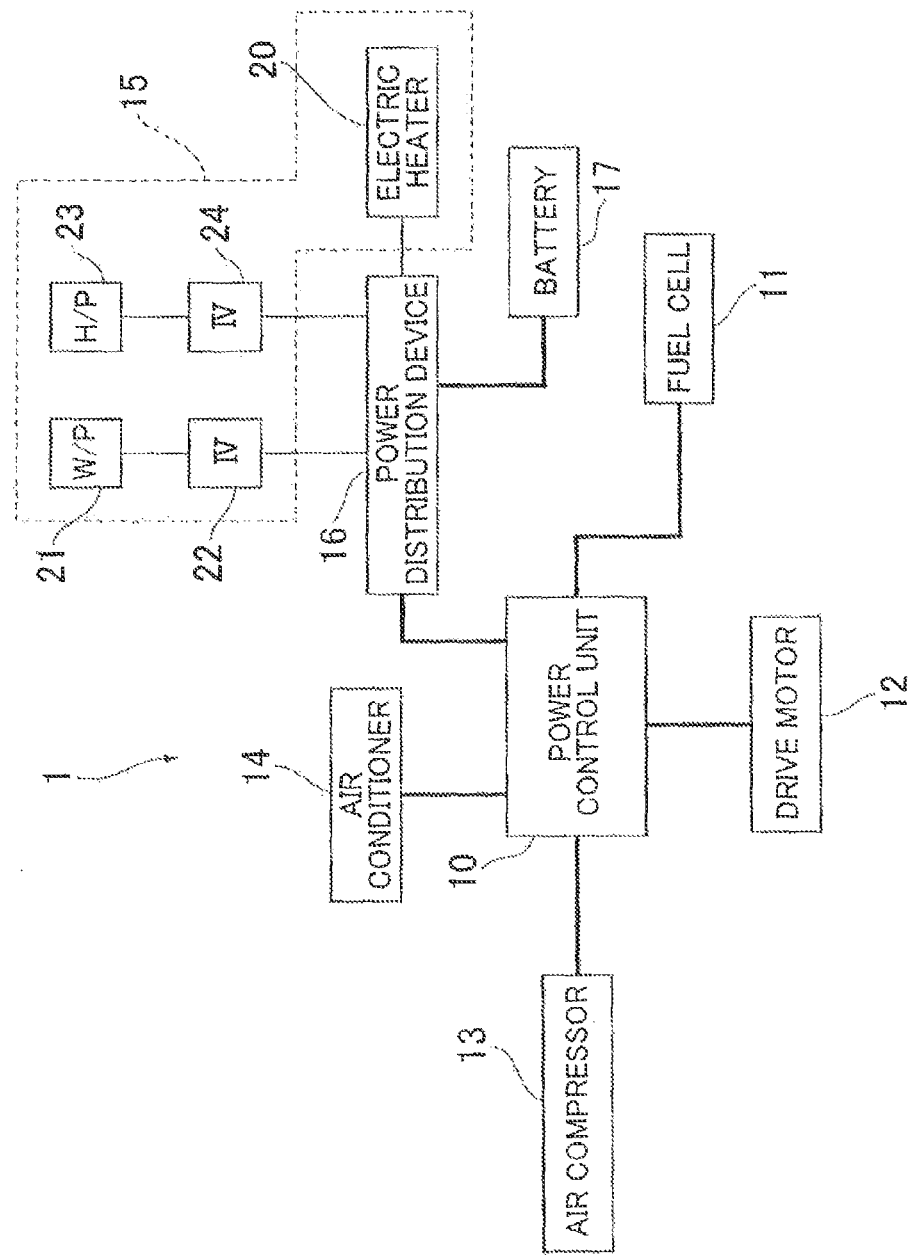
FIG. 1 is a schematic view illustrating a configuration of an electrical system in a fuel cell vehicle that includes a power distribution device.

Hereinafter, description will be provided on an embodiment of the present invention with reference to the accompanying drawings. In order to facilitate understanding, the same components in the drawings are denoted by the same reference numerals if possible, and redundant description will be omitted.

FIG. 1 is a schematic view of a configuration of an electrical system in a fuel cell vehicle (a vehicle provided with a fuel cell) 1 that includes a power distribution device 16 according to the embodiment of the present invention. Although the power distribution device 16 is installed in the fuel cell vehicle 1 in the following embodiment, the present invention is not limited to this configuration. The power distribution device 16 may be installed in another vehicle, or may be electrically connected to another device in the vehicle.

The fuel cell vehicle 1 has, for example, a configuration in which a fuel cell (FC) 11, a drive motor 12 that drives front wheels, an air compressor 13 that supplies oxygen to the fuel cell 11 during power generation performed by the fuel cell 11, an air conditioner 14 that conditions the air in a vehicle cabin, a plurality of power generation auxiliary machines (high-voltage driven devices) 15 operated during the power generation performed by the fuel cell 11, the power distribution device 16, and a battery 17 are electrically connected to a power control unit (PCU) 10.

The fuel cell 11 has, for example, a configuration in which a large number of solid polymer fuel cells (unit cells), each of which has a membrane electrode assembly (MEA), are stacked. In the fuel cell 11 with this configuration, an electromotive force is obtained when an electrochemical reaction occurs between hydrogen as fuel gas and oxygen as oxidant gas that is contained in air, in each electrode.

The power control unit 10 controls electric power in the vehicle, supplies electric power generated by the fuel cell 11 and electric power from the battery 17, to a device that needs electric power, such as the drive motor 12, and stores the electric power, which has been generated by the fuel cell 11, in the battery 17.

The battery 17 is connected to the power control unit 10 via the power distribution device 16. The power generation auxiliary machines 15 are electrically connected to the power distribution device 16. For example, the power distribution device 16 is electrically connected to each of an electric heater 20 that heats the fuel cell 11, an inverter 22 for a fuel cell pump, for example, a coolant (cooling water) pump 21 that cools the fuel cell 11, and an inverter 24 for a hydrogen pump 23 that supplies hydrogen gas as the fuel gas to the fuel cell 11. Accordingly, the electric power from the battery 17 is supplied to each of the auxiliary machines via the power distribution device 16.

Figure 2:
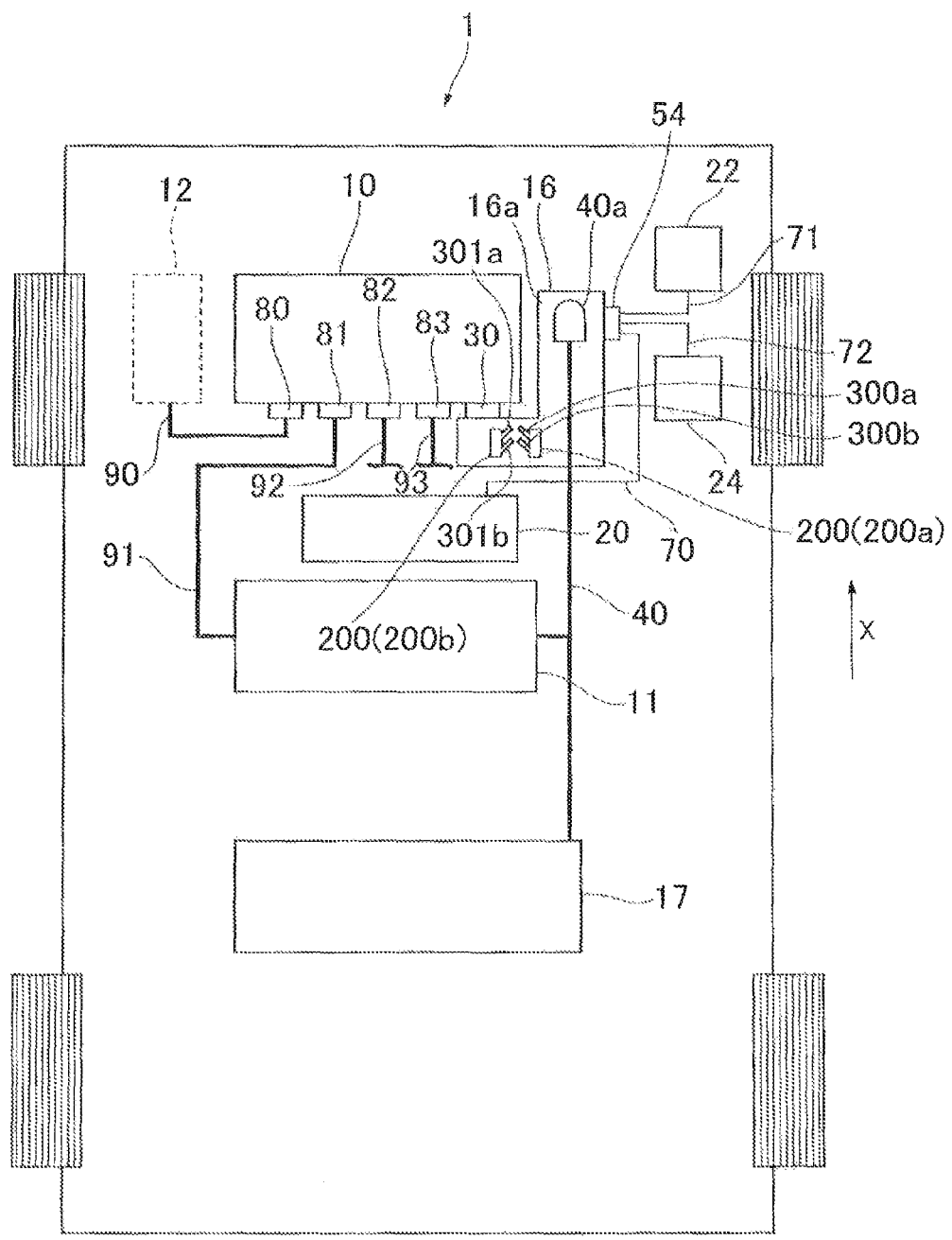
FIG. 2 is a schematic view of an example of arrangement of devices in the vehicle.
Figure 3:
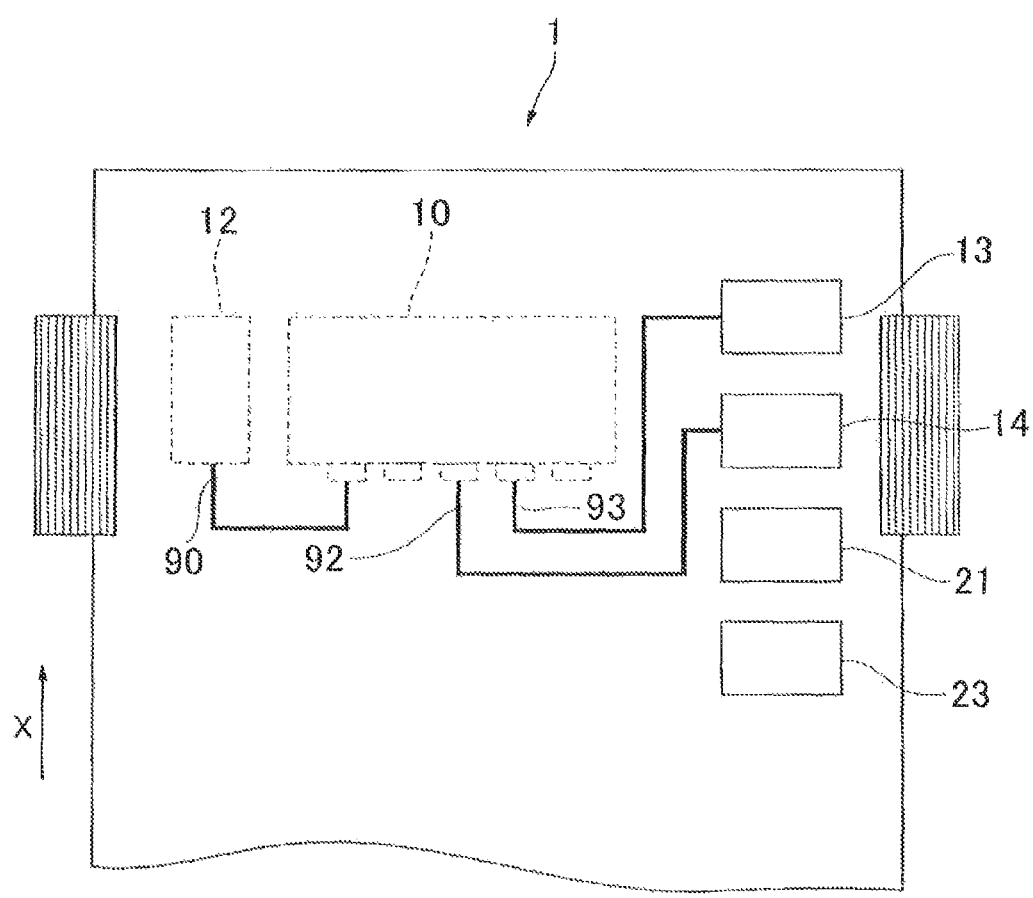
FIG. 3 is a schematic view of an example of arrangement of the devices in a lower level in the vehicle.

FIG. 2 and FIG. 3 show examples in which the electrical system is installed in the fuel cell vehicle 1. In the following description, "front" signifies a forward traveling direction of the fuel cell vehicle 1 (or the front side when the fuel cell vehicle 1 faces the forward traveling direction), and "rear" signifies a reverse traveling direction of the fuel cell vehicle 1 (or the rear side when the fuel cell vehicle 1 faces the forward traveling direction), unless otherwise specified. In addition, "right" signifies the right side when the fuel cell vehicle 1 faces the forward traveling direction, and "left" signifies the left side when the fuel cell vehicle 1 faces the forward traveling direction.

As shown in FIG. 2, the power control unit 10 is formed in a rectangular shape, for example, and provided at the center in the front portion of the vehicle. The power distribution device 16 is disposed along a side surface (a right side surface in FIG. 2) of the power control unit 10. The electric heater 20 and the battery 17 are disposed behind the power control unit 10 (an X direction in FIG. 2 indicates a direction toward the front side). The inverters 22, 24 are disposed on the right side of the power distribution device 16. The drive motor 12, the air compressor 13, the air conditioner 14, the coolant pump 21, and the hydrogen pump 23 are provided in a lower level than the power control unit 10. For example, as shown in FIG. 3, the drive motor 12 is disposed on the left side of the power control unit 10, and the air compressor 13, the air conditioner 14, the coolant pump 21, and the hydrogen pump 23 are disposed on the right side of the power control unit 10.

Connection terminals 80, 81, 82, 83 are provided on a rear surface of the power control unit 10. Harnesses 90, 91, 92, 93 that respectively lead to the drive motor 12, the fuel cell 11, the air conditioner 14, and the air compressor 13 are respectively connected to the connection terminals 80 to 83. These connection terminals 80 to 83 are provided in alignment with a coupling portion 30 for the power distribution device 16.

As shown in FIG. 2, the power distribution device 16 is directly connected to the power control unit 10 without providing a harness therebetween. More specifically, the power distribution device 16 is formed to have a substantially L shape in a plan view, and is disposed along the one side surface (the right side surface) and the rear surface of the power control unit 10. The coupling portion 30 for directly coupling and fixing the power distribution device 16 and the power control unit 10 to each other is provided on the rear surface side of the power control unit 10. The coupling portion 30 is constituted by a plug-in hole (not shown) on the power control unit 10-side and a plug-in terminal (not shown) on the power distribution device 16-side, for example. Thus, when the plug-in terminal of the power distribution device 16 is plugged in the plug-in hole of the power control unit 10, the power control unit 10 and the power distribution device 16 are fixed to each other to allow energization therebetween.

A harness 40 that leads to the battery 17 is connected to an upper surface of a long side portion 16a (a portion extending along the right side surface of the power control unit 10) of the power distribution device 16. A terminal 40a of the harness 40 is fitted in a fitting hole (not shown) formed on an upper surface of a case of the power distribution device 16, and is fixed.

As shown in FIG. 2, a connection terminal 54 is provided on a side (the right side) of the power distribution device 16, the side being opposite to the power control unit 10. Harnesses 70, 71, 72 that respectively lead to the electric heater 20 and the inverters 22, 24 are connected to this connection terminal 54. Since the power distribution device 16 is provided as described above, the electric power can be supplied from the power distribution device 16 to each of the power generation auxiliary machines. Thus, an increase in the number of the high-voltage harnesses can be suppressed.

Figure 4:
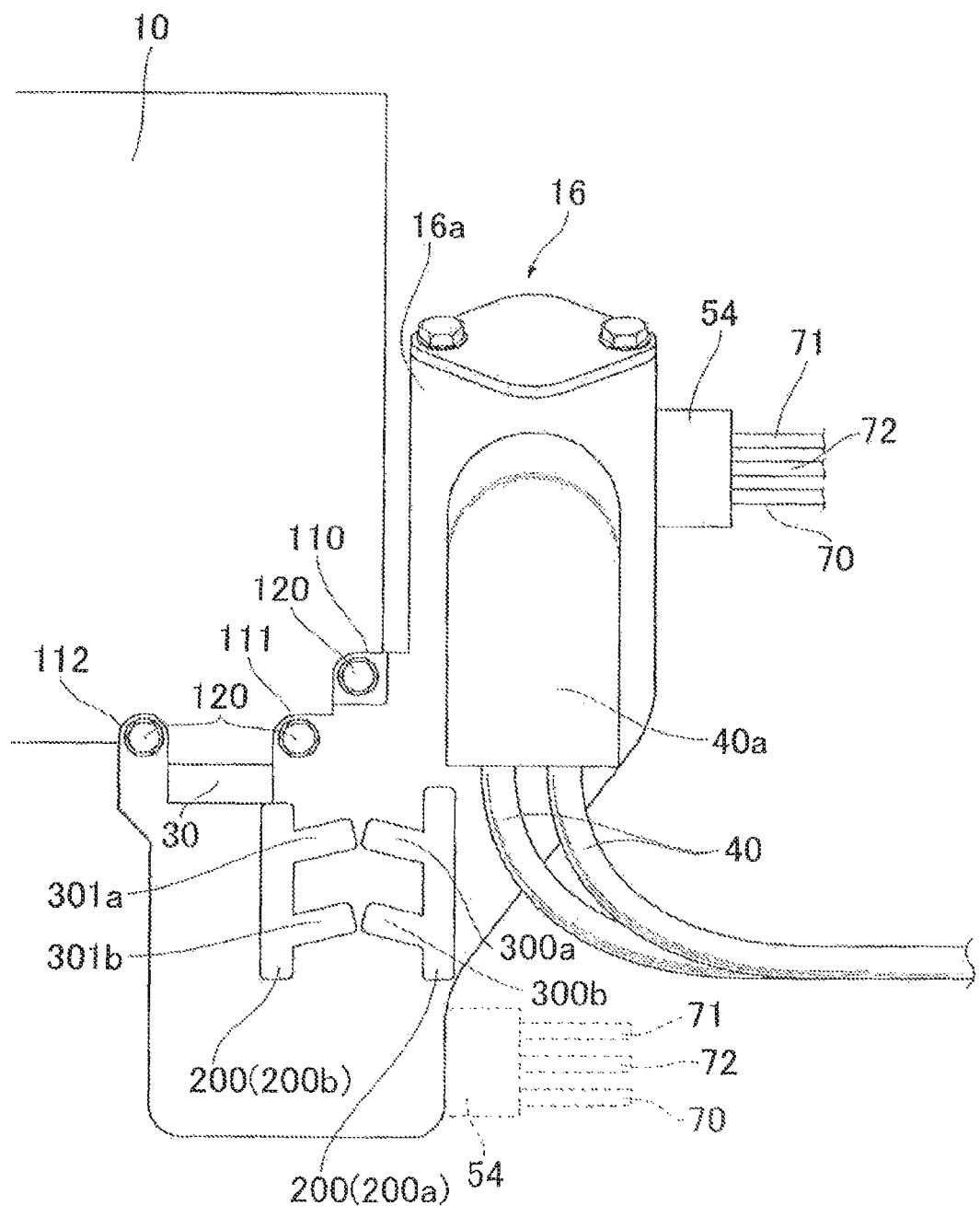
FIG. 4 is a plan view illustrating a schematic configuration of the power distribution device.

When the power distribution device 16 is disposed closer to the front end of the fuel cell vehicle 1, the connection terminal 54 may be provided in the rear side of the power distribution device 16, and the harnesses 70, 71, 72, which respectively lead to the electric heater 20 and the inverters 22, 24, may be connected to this connection terminal 54, as shown by dotted lines in FIG. 4. With the configuration, it is possible to prevent the connection terminal 54 and each of the harnesses 70, 71, 72 from being damaged by a vehicle collision.

Since the power distribution device 16 is formed to have the L shape in the plan view and is disposed along the one side surface and the rear surface of the power control unit 10, the power control unit 10 and the power distribution device 16 can be integrated in a compact manner.

The power distribution device 16 and the battery 17 are connected by the harness 40, and the harness 40 is connected to the upper surface of the power distribution device 16. Thus, a connected portion of the high-voltage harness 40 is protected at the time of the collision of the vehicle 1. In addition, as compared to a case where the harness 40 is connected to another portion of the power distribution device 16, an operator can easily access to the connected portion. Therefore, manufacturability and assemblability of the vehicle 1 can be improved.

As will be described below, the power distribution device 16 includes projected portions 200a, 200b, ribs 300a, 300b, 301a, 301b, and fixed portions (not shown in FIG. 2). The projected portions 200a, 200b are provided to suppress movement of the power distribution device 16 toward the vehicle rear side when an impact is applied from the vehicle front side. The ribs 300a, 300b, 301a, 301b are provided to receive the impact applied to the projected portions 200a, 200b while being compressed.

Figure 5:
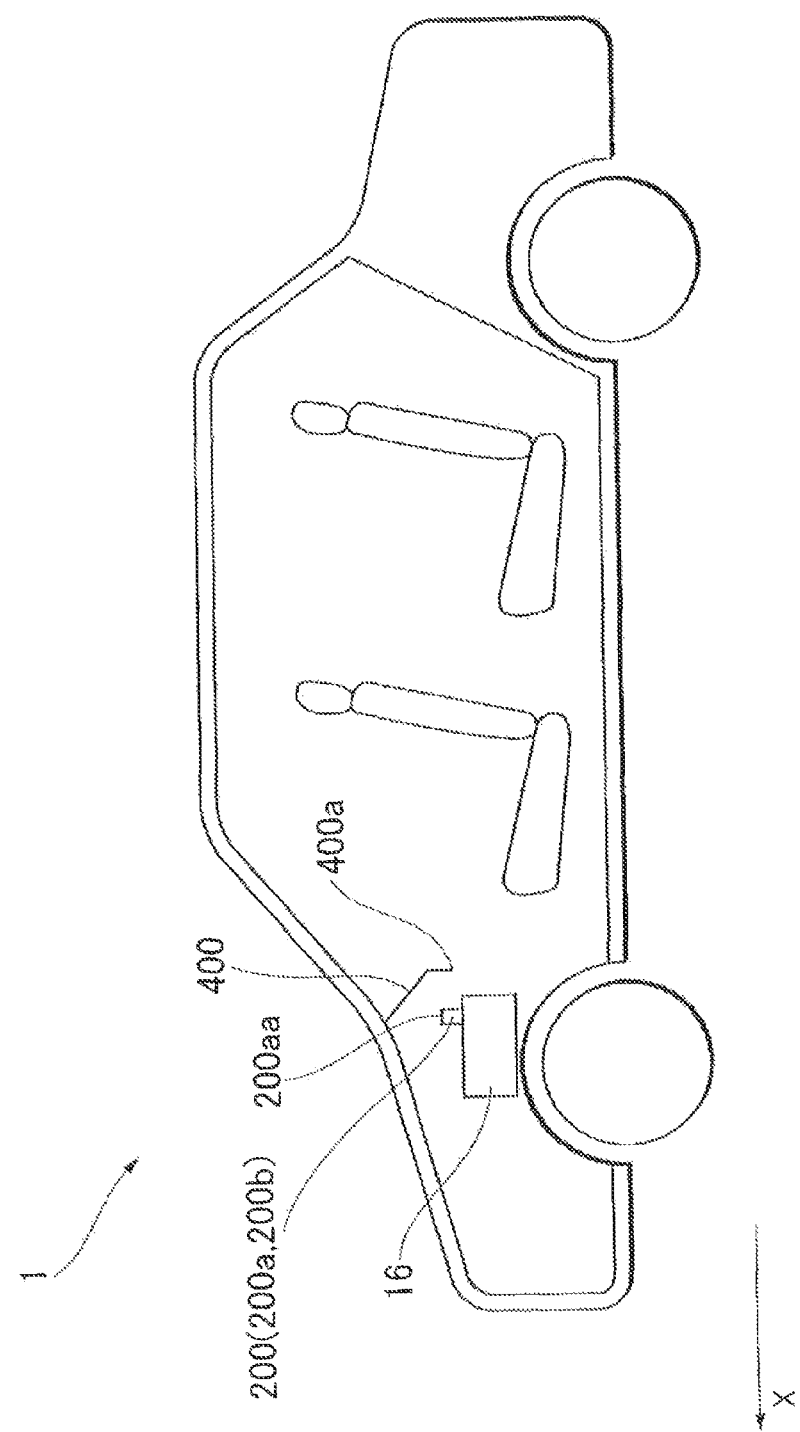
FIG. 5 is an explanatory view illustrating a positional relationship in a vehicle height direction between the power distribution device and a vehicle component.
Figure 7:
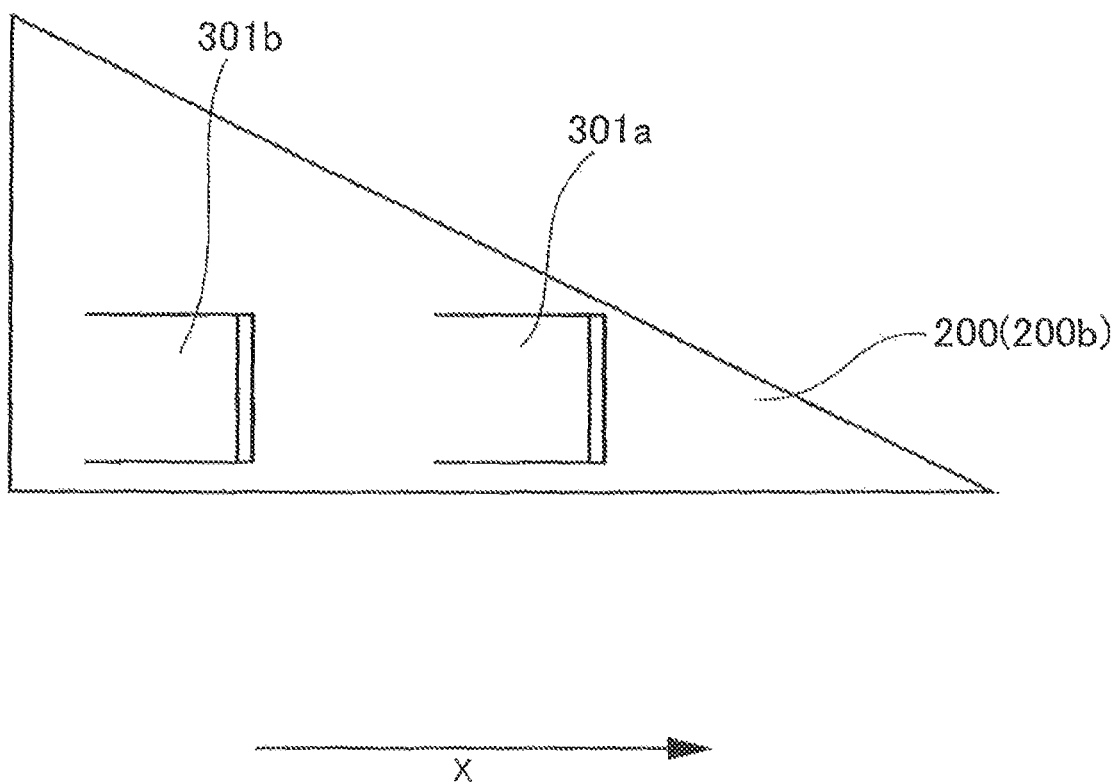
FIG. 7 is a side view illustrating a schematic configuration of the projected portion and ribs.

Next, the configuration of the power distribution device 16 will be further described with reference to FIG. 4, FIG. 5, and FIG. 7. FIG. 4 is a plan view illustrating the schematic configuration of the power distribution device 16. FIG. 5 illustrates a positional relationship in a vehicle height direction between the power distribution device 16 and a vehicle component 400. FIG. 7 is a side view illustrating the schematic configuration of the projected portion 200b and the ribs 301a, 301b.

The power distribution device 16 is installed in the front portion of the vehicle, and a high-voltage power line (for example, the harness 40 shown in FIG. 4) is disposed behind the position at which the power distribution device 16 is installed. The power distribution device 16 includes the projected portions 200a, 200b and the ribs 300a, 300b, 301a, 301b that are provided on a surface of the power distribution device 16. The power distribution device 16 further includes fixed portions 110, 111, 112 provided in a connected portion where the power distribution device 16 is connected to the power control unit 10.

As shown in FIG. 4, the projected portions 200a, 200b are provided to be projected in the vehicle height direction from the surface of the case of the power distribution device 16. The projected portions 200a, 200b are provided in parallel with each other in a manner such that the projected portions 200a, 200b are located at an interval in a right-left direction and extend in a vehicle longitudinal direction. Of the projected portions 200a, 200b, the one projected portion 200a is provided in the outer side (the right side in FIG. 4) in the power distribution device 16, and the other projected portion 200b is provided in the inner side (the left side in FIG. 4) in the power distribution device 16. In this embodiment, the one projected portion 200a and the one projected portion 200b are provided to have the substantially same height. However, the number and lengths of the projected portion 200a and the projected portion 200b can be appropriately changed.

As shown in FIG. 5, the projected portions 200a, 200b are provided in a manner such that upper ends 200aa thereof are located at a higher position in the vehicle height direction than a position of a lower end 400a of the vehicle component 400 that is disposed behind the power distribution device 16 in the vehicle. In other words, the projected portions 200a, 200b are provided to be projected from the power distribution device 16 in a manner such that the projected portions 200a, 200b are located at such a height that they contact the vehicle component 400 when the power distribution device 16 moves toward the rear side (the right side in FIG. 5) of the vehicle. In this embodiment, the vehicle component 400 signifies a dashboard or a cowl, for example.

With the configuration as described above, when the power distribution device 16 moves toward the vehicle rear side due to the impact from the vehicle front side, the projected portions 200a, 200b, which are provided in the power distribution device 16, contact the vehicle component 400 disposed behind the power distribution device 16 in the vehicle. Thus, it is possible to suppress the movement of the power distribution device 16 toward the vehicle rear side. As a result, the high-voltage power line disposed behind the power distribution device 16 can be prevented from being damaged.

As shown in FIG. 4, the ribs 300a, 300b (first ribs) are provided on the inner side of the projected portion 200a (a left side surface of the projected portion 200a (first projected portion) in FIG. 4) that is provided in the power distribution device 16. A plurality of the ribs 300a, 300b is provided to be projected toward the left side from the left side surface of the projected portion 200a, for example. In addition, the ribs 300a, 300b are formed integrally with the projected portion 200a in a manner such that the ribs 300a, 300b are tilted toward the front side in the vehicle longitudinal direction. In this embodiment, the one rib 300a and the one rib 300b are arranged in the vehicle longitudinal direction along the left side surface of the projected portion 200a. However, the number of the ribs 300a, 300b can be appropriately changed.

As shown in FIG. 4 and FIG. 7, the ribs 301a, 301b (second ribs) are provided on the outer side of the projected portion 200b (a right side surface of the projected portion 200b (second projected portion) in FIG. 4) that is provided in the power distribution device 16. A plurality of the ribs 301a, 301b is provided in a manner such that the ribs 301a, 301b are projected toward the right side from the right side surface of the projected portion 200b, for example. In addition, the ribs 301a, 301b are formed integrally with the projected portion 200b in a manner such that the ribs 301a, 301b are tilted toward the front side in the vehicle longitudinal direction. In this embodiment, the one rib 301a and the one rib 301b are provided in the vehicle longitudinal direction along the right side surface of the projected portion 200b. However, the number of the ribs 301a, 301b can be appropriately changed.

As described above, the ribs 300a, 300b, 301a, 301b that are tilted toward the vehicle front side are provided in the projected portions 200a, 200b. Thus, when an impact is applied from the vehicle front side, the ribs 300a, 300b, 301a, 301b can receive the impact applied to the projected portions 200a, 200b while the ribs 300a, 300b, 301a, 301b are compressed. In addition, as described above, when the projected portions 200a, 200b and the ribs 300a, 300b, 301a, 301b are manufactured integrally with the case of the power distribution device 16, for example, by casting, it is possible to improve rigidity when a compression load is applied due to the impact from the vehicle front side, since strength of a casted article is higher in a compression direction than in a tensile direction.

As shown in FIG. 4, the fixed portions 110, 111, 112 are provided in the connected portion where the power distribution device 16 is connected to the power control unit 10. The fixed portions 110, 111, 112 are members that fasten the power distribution device 16 and the power control unit 10 to each other. In this embodiment, for example, the three fixed portions 110, 111, 112 are provided in the portion where the power distribution device 16 and the power control unit 10 are fastened to each other. Each of the fixed portions 110, 111, 112 is constituted by, for example, a plate-shaped member with a through hole. The power distribution device 16 and the power control unit 10 can be fastened to each other by inserting bolts 120 in the through holes of the fixed portions 110, 111, 112 and holes in the power control unit 10.

Figure 6:
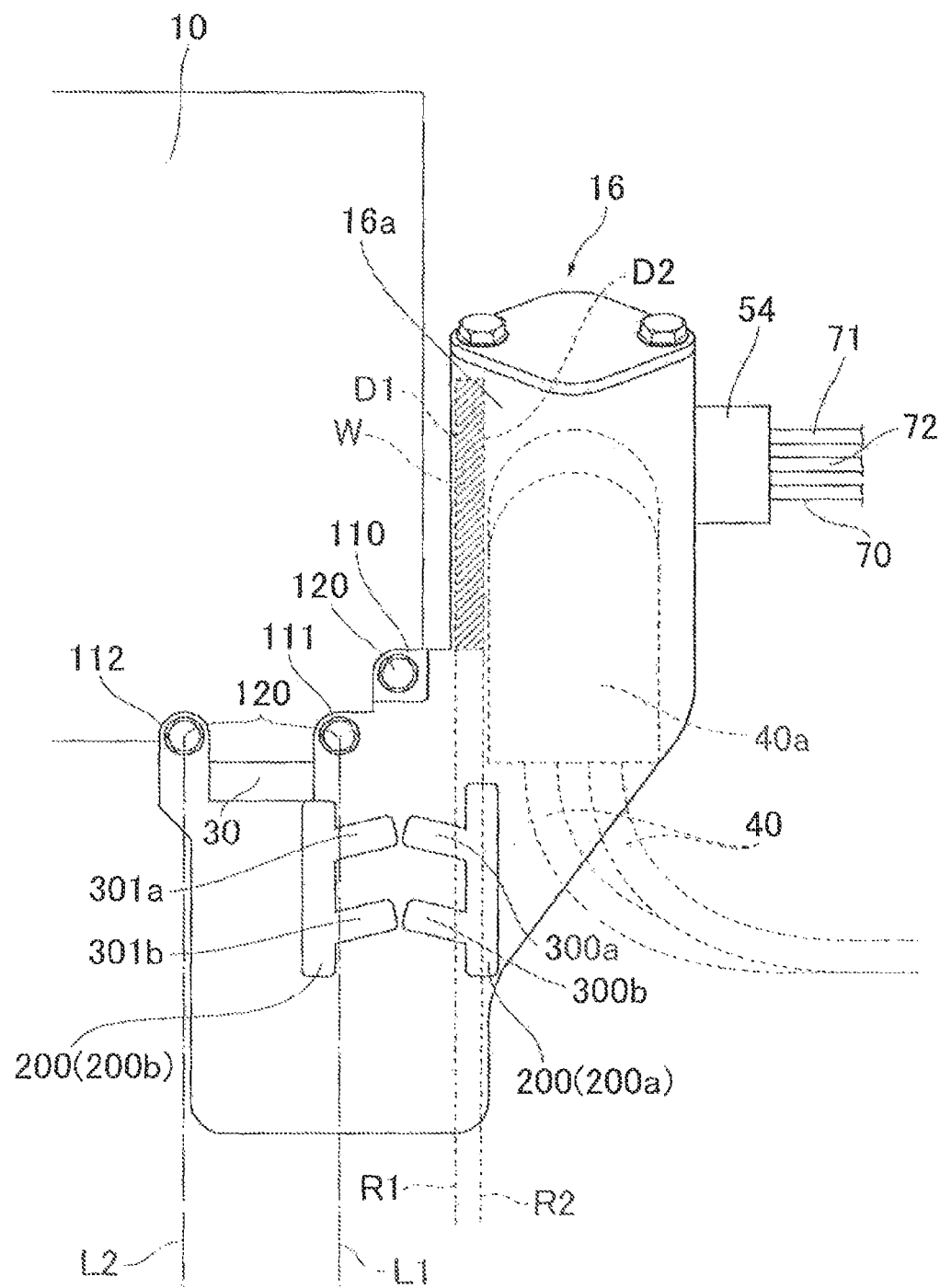
FIG. 6 is an explanatory view illustrating a positional relationship in a vehicle longitudinal direction between fixed portions and a projected portion and a positional relationship in the vehicle longitudinal direction between a side wall portion and the projected portion of the power distribution device.

Next, with reference to FIG. 6, description will be provided on a positional relationship in the vehicle longitudinal direction between the fixed portions 110, 111, 112 and the projected portion 200b and a positional relationship in the vehicle longitudinal direction between a side wall portion W of the power distribution device 16 and the projected portion 200a.

First, the positional relationship in the vehicle longitudinal direction between the fixed portions 110, 111, 112 and the projected portion 200b will be described. As shown in FIG. 6, the at least one projected portion 200b is provided in the power distribution device 16 so as to be positioned in a region between an extension line L1 that extends in the vehicle longitudinal direction through the one fixed portion 111 and an extension line L2 that extends in the vehicle longitudinal direction through the other fixed portion 112. In this embodiment, the projected portion 200b is provided behind the fixed portions 111, 112 in the vehicle so as to be positioned in the region between the extension line LA and the extension line L2 over the entire longitudinal length of the projected portion 200b. Although the one projected portion 200b is disposed in the region between the extension line L1 and the extension line L2 in this embodiment, a plurality of the projected portions 200b may be disposed, and the number thereof can be appropriately changed. The projected portion 200b is disposed in the region between the extension line L1 that extends in the vehicle longitudinal direction through the fixed portion 111 and the extension line L2 that extends in the vehicle longitudinal direction through the fixed portion 112, the fixed portion 111 and the fixed portion 112 being the two fixed portions disposed on the left side, among the three fixed portions 110, 111, 112. In addition to this case, the projected portion 200b may be disposed in a region between an extension line (not shown) that extends in the vehicle longitudinal direction through the fixed portion 110 and the extension line L1 that extends in the vehicle longitudinal direction through the fixed portion 111, the fixed portion 110 and the fixed portion 111 being the two fixed portions disposed on the right side.

Since the projected portion 200b is provided as described above, an impact force applied to the projected portion 200b can be directly transmitted to the fixed portions 111, 112. Thus, when an impact is applied from the vehicle front side, it is possible to suppress occurrence of a situation in which the power distribution device 16 moves in a direction so as to rotate around the fixed portions 111, 112. In addition, since the impact force applied to the projected portion 200b can be directly transmitted to the fixed portions 111, 112 when the impact is applied from the vehicle front side, it is possible to suppress occurrence of a situation in which a member adjacent to the fixed portions 111, 112 is damaged as a result of the force being applied to the member. In other words, since strength of the member adjacent to the fixed portions 111, 112 needs not be increased, it is not necessary to additionally provide reinforcement against the collision. Therefore, it is possible to suppress an increase in a vehicle weight and an increase in cost.

Next, the positional relationship in the vehicle longitudinal direction between the side wall portion W of the case of the power distribution device 16 and the projected portion 200a will be described. As shown in FIG. 6, the side wall portion W on the left side (a portion extending along the right side surface of the power control unit 10 in FIG. 6) in the long side portion 16a of the case of the power distribution device 16 has a thickness that is set to a specified width. In other words, the side wall portion W in this embodiment signifies a portion between an outer wall D1 on the left side in the long side portion 16a of the power distribution device 16 and an inner wall D2 on the right side in the long side portion 16a of the power distribution device 16. A part of or a whole of the at least one projected portion 200a is provided on an extension line that extends in the vehicle longitudinal direction through the side wall portion W, that is, between an extension line R1 that extends in the vehicle longitudinal direction through the outer wall D1 and an extension line R2 that extends in the vehicle longitudinal direction through the inner wall D2. In other words, a part of the projected portion 200a is positioned between the extension line R1 and the extension line R2 in this embodiment. However, the entire projected portion 200a may be positioned between the extension line R1 and the extension line R2. In this embodiment, the one projected portion 200a is disposed on the extension line that extends in the vehicle longitudinal direction through the side wall portion W. However, a plurality of the projected portions 200a may be disposed on the extension lines that extend in the vehicle longitudinal direction through the side wall portion W, and the number thereof can be appropriately changed.

As described above, since the at least one projected portion 200a is provided on the extension line that extends in the vehicle longitudinal direction through the side wall portion W, the force applied from the front side of the power distribution device 16 due to the impact from the vehicle front side can be easily transmitted to the projected portion 200a.

Description has been provided on the embodiment of the present invention. The embodiment is an example embodiment for describing the present invention, and there is no intension to limit the scope of the present invention to this embodiment. The present invention can be implemented in various other embodiments.

For example, in the above embodiment, the power control unit is electrically connected to the air conditioner, the drive motor, and the air compressor in addition to the battery and the fuel cell. However, the present invention is not limited to the configuration. The power control unit may be electrically connected to other devices in the vehicle. The other devices may include some of the power generation auxiliary machines that are operated during the power generation, such as the air compressor. In addition, in the above embodiment, the power generation auxiliary machines that are connected to the power distribution device include the electric heater as well as the hydrogen pump and the coolant pump, each of which includes the inverter. However, types and the number of the power generation auxiliary machines can be appropriately changed. Furthermore, in the above embodiment, the power control unit and the power distribution device are directly connected to each other. However, the present invention can also adopt a configuration in which the power control unit and the power distribution device are connected by a harness.

What is claimed is:

1. A power distribution device that is electrically connected to a battery, a power control unit that controls electric power in a vehicle, and high-voltage driven devices driven at a specified voltage or higher, wherein the power distribution device distributes electric power supplied from the battery to the high-voltage driven devices, the power distribution device is installed in a front portion of the vehicle, and a high-voltage power line is disposed behind a position at which the power distribution device is installed, the power distribution device comprising
    a projected portion provided on a surface of a case of the power distribution device, the projected portion having a height corresponding to a vehicle component disposed behind the power distribution device in the vehicle; and
    a plurality of fixed portions that fix the power control unit and the case of the power distribution device to each other,
    wherein the protected portion is provided in a region between an extension line that extends in a vehicle longitudinal direction through one of the fixed portions and an extension line that extends n the vehicle longitudinal direction through another of the fixed portions.

2. The power distribution device according to claim 1, wherein an upper end of the projected portion is located at a higher position in a vehicle height direction than a position of a lower end of the vehicle component.

3. The power distribution device according to claim 1, wherein a rib is provided on the projected portion, and the rib is tilted forward as the rib extends outward in a right-left direction of the vehicle.

4. The power distribution device according to claim 1, wherein a plurality of the projected portions is provided.

5. The power distribution device according to claim 1, wherein a plurality of the projected portions is provided, and at least one of the projected portions is provided on an extension line that extends in the vehicle longitudinal direction through a side wall portion in a front side of the case of the power distribution device in the vehicle.

6. The power distribution device according to claim 1, wherein:
    a plurality of the projected portions is provided, and the projected portions include at least one first projected portion and at least one second projected portion;
    a first rib is provided on an inner side of the at least one first projected portion in the right-left direction of the vehicle, and the first rib is tilted forward as the first rib extends inward in the right-left direction of the vehicle; and
    a second rib is provided on an outer side of the at least one second projected portion in a right-left direction of the vehicle, and the second rib is tilted forward as the second rib extends outward in the right-left direction of the vehicle.

* * * * *